US009797756B2

(12) United States Patent
Silva et al.

(10) Patent No.: US 9,797,756 B2
(45) Date of Patent: Oct. 24, 2017

(54) UNDERLYING WALL STRUCTURE FINDER AND INFRARED CAMERA

(71) Applicant: Fluke Corporation, Everett, WA (US)

(72) Inventors: Luis R. Silva, Everett, WA (US); Michael D. Stuart, Issaquah, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 14/921,074

(22) Filed: Oct. 23, 2015

(65) Prior Publication Data

US 2016/0116309 A1    Apr. 28, 2016

Related U.S. Application Data

(60) Provisional application No. 62/068,397, filed on Oct. 24, 2014.

(51) Int. Cl.
| | |
|---|---|
| *G01D 5/40* | (2006.01) |
| *G01J 5/10* | (2006.01) |
| *H04N 5/33* | (2006.01) |
| *G01V 3/15* | (2006.01) |
| *G01J 5/02* | (2006.01) |
| *H04N 5/232* | (2006.01) |
| *G01J 5/00* | (2006.01) |

(52) U.S. Cl.
CPC .............. *G01D 5/40* (2013.01); *G01J 5/02* (2013.01); *G01V 3/15* (2013.01); *H04N 5/23293* (2013.01); *H04N 5/33* (2013.01); *G01J 2005/0077* (2013.01)

(58) Field of Classification Search
CPC ...... G01D 5/40; G01J 2005/0077; G01J 5/02; H04N 5/23293; H04N 5/33
See application file for complete search history.

(56) References Cited

U.S. PATENT DOCUMENTS

| | | | |
|---|---|---|---|
| 7,535,002 B2 | 5/2009 | Johnson et al. | |
| 7,994,480 B2 | 8/2011 | Johnson et al. | |
| 8,186,873 B1* | 5/2012 | Madding | G01N 25/18 |
| | | | 250/338.1 |

(Continued)

FOREIGN PATENT DOCUMENTS

DE    102004007314 A1    8/2005

OTHER PUBLICATIONS

International Search Report and Written Opinion for PCT/US2015/057117, Date of Mailing: Feb. 1, 2016, 12 pages.

(Continued)

*Primary Examiner* — Mark R Gaworecki
(74) *Attorney, Agent, or Firm* — Fredrikson & Byron, P.A.

(57) ABSTRACT

Tools used to detect underlying structures, such as behind the surface of a wall, can include a first sensor, such as an electromagnetic sensor, configured to generate data indicative of the location of the underlying structure. Tools can include an indicator that provides an indication to a user based on the data. Tools can additionally or alternatively include an infrared imaging device for generating infrared image data indicative of the heat pattern of a scene. A display can display the generated infrared image data. Underlying structures may be visible in the heat pattern of the scene. The tool can indicate the presence of an underlying structure feature to an operator via one or both of the display and the indicator.

25 Claims, 11 Drawing Sheets

(56) References Cited

U.S. PATENT DOCUMENTS

| | | | |
|---|---|---|---|
| 8,274,273 B2* | 9/2012 | Nguyen | H01M 2/1055 173/170 |
| 2004/0190586 A1* | 9/2004 | Lee | G01N 25/72 374/5 |
| 2005/0259715 A1* | 11/2005 | Lee | G01N 25/72 374/124 |
| 2007/0087311 A1* | 4/2007 | Garvey, III | G01J 5/00 434/21 |
| 2007/0198226 A1* | 8/2007 | Lee | G01W 1/17 702/189 |
| 2008/0295582 A1* | 12/2008 | Lee | G01N 25/72 73/74 |
| 2010/0117885 A1* | 5/2010 | Holbrook | H04N 1/107 342/22 |
| 2010/0225299 A1* | 9/2010 | Nguyen | G01V 3/10 324/67 |
| 2011/0239794 A1 | 10/2011 | Krapf et al. | |
| 2012/0206129 A1* | 8/2012 | Mahan | G01C 17/38 324/202 |
| 2013/0010287 A1* | 1/2013 | Tutton | G01V 3/15 356/213 |
| 2013/0321621 A1 | 12/2013 | Menzel | |
| 2014/0042319 A1 | 2/2014 | Pickett et al. | |
| 2014/0267757 A1 | 9/2014 | Abramson et al. | |
| 2015/0269742 A1 | 9/2015 | Bergstrom et al. | |

OTHER PUBLICATIONS

U.S. Appl. No. 14/837,757, filed Aug. 27, 2015, entitled "Edge Enhancement for Thermal-Visible Combined Images and Cameras," 62 pages.

* cited by examiner

UNDERLYING WALL STRUCTURE FINDER AND INFRARED CAMERA

CROSS-REFERENCES

This application claims the benefit of U.S. Provisional Application No. 62/068,397, filed Oct. 24, 2014, and entitled "UNDERLYING WALL STRUCTURE FINDER AND INFRARED CAMERA," the content of which is hereby incorporated by reference in its entirety.

BACKGROUND

Determining the location of underlying objects behind a wall is useful in a variety of applications. For instance, detecting the locations of studs behind a wall surface allows for locating and utilizing the structural support provided by the studs without breaking the wall or performing error-prone estimates. However, traditional stud finders can often provide incorrect readings depending upon materials and techniques used during construction of a structure. For a variety of reasons, such errors can result in false positive detection or missed studs entirely.

SUMMARY

Aspects of the disclosure are directed toward methods and devices for detecting the presence of studs utilizing traditional stud finder concepts and infrared (IR) imaging techniques. Traditional stud finders can include, for example, electromagnetic, magnetic, capacitive, acoustic, or radar systems, or any other known system for detecting studs or other underlying structure beneath a wall surface.

Generally, when a temperature difference exists between one side of a wall and another, heat flows from the area of greater concentration to the area of lesser concentration. Heat travels through the wall structures which are in direct contact with each other through a process known as conduction. For example, common wall materials such as drywall are often physically attached to the underlying stud framework. Areas in between the studs are usually filled with less dense material such as insulation, or only air. Heat does not travel through these areas at the same rate as through the areas of direct contact (e.g., stud locations). Accordingly, the heat pattern of an area under analysis can provide information regarding the locations of studs in a wall due to such differences in thermal energy transfer between an outside surface and the wall surface. Portions of the wall in conductive contact with a stud will tend to have a temperature more similar to that of the environment on the other side of the wall than will portions of the wall not in conductive contact with a stud, resulting in a thermal gradient along the surface of the wall proximate a stud. Thus, analysis of the heat pattern of the wall, for instance, with an IR camera, can often reveal the locations of studs or other underlying wall framework or elements. In some examples, the IR camera can be further used to detect, for example, live electrical wires running behind a wall.

Aspects of the present disclosure are directed toward tools, systems, and methods for detecting underlying structures. In some embodiments, an underlying wall structure finder can include a first sensor configured to generate a first set of data indicative of the location of a stud or other underlying structure beneath the surface of a wall. In various embodiments, the first sensor can include a sensor typically used for detecting studs, such as an electromagnetic sensor. In some examples, the underlying wall structure finder can include an indicator such as a light and/or tone generator configured to alert a user of the presence of a detected structure.

Additionally or alternatively, an underlying wall structure finder can include an infrared imaging device configured to generate infrared image data indicative of the heat pattern of a target scene, and in some examples, a display for displaying the infrared image data. As described, in some instances, infrared image data can reveal locations of studs or underlying structures. In some embodiments, the underlying wall structure finder can be configured so that at least one of the indicator and the display provides an indication to a user regarding the presence of underlying wall structure.

In various examples, the indication provided to the user can include a visual representation. In some embodiments, the visual representation can include an indicator element, an outline, and/or a centerline to represent the location of underlying structure on a display. In some embodiments, the visual representation can include a likelihood that the identified portion of a display includes underlying wall structure.

Some embodiments are directed toward a handheld imaging device including an infrared imaging sensor, a display for presenting a representation of IR image data, and a processor configured to process IR image data to generate the representation for the display. Processing can comprise including on the display one or more indicators representing the location of a stud or other underlying structure.

DETAILED DESCRIPTION

Figure 1:
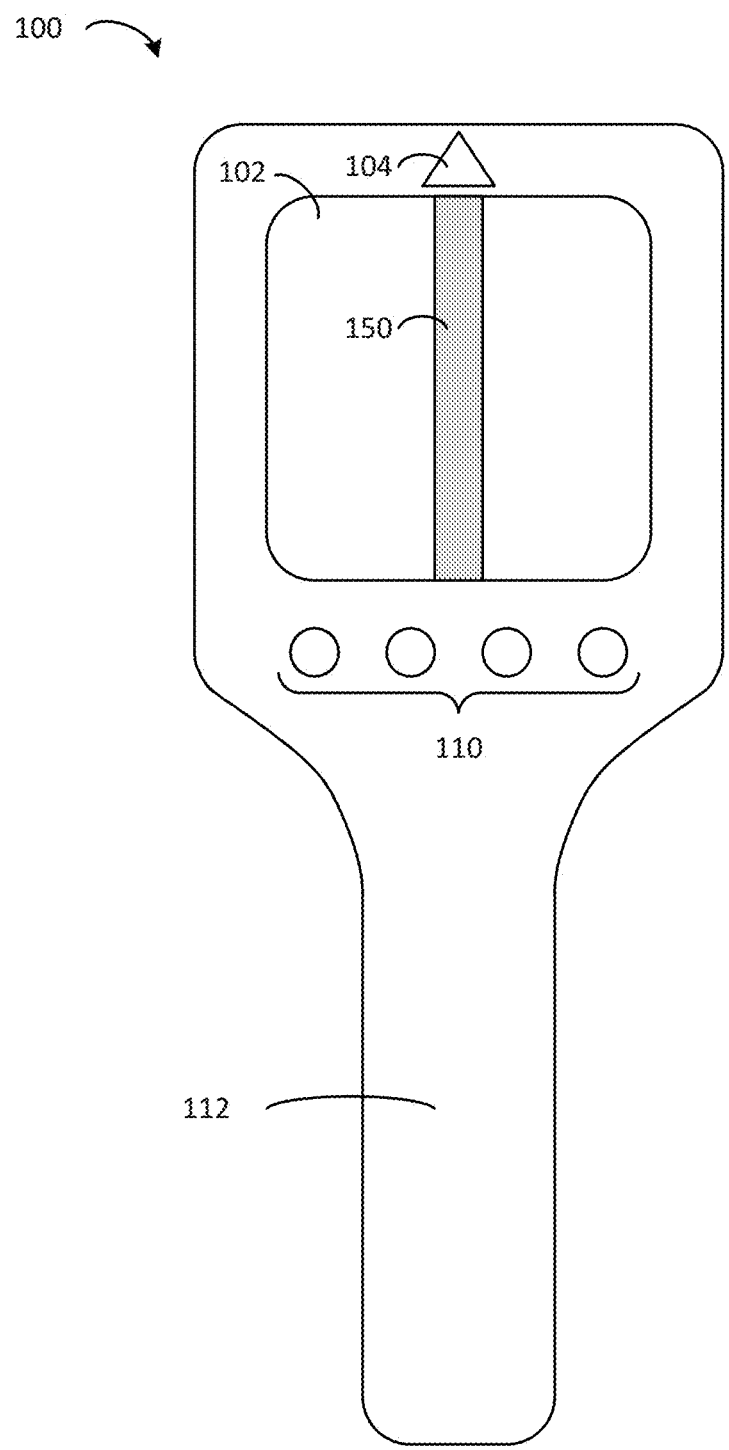
FIG. 1 is an exemplary view of a stud finder according to some embodiments of the invention.

A stud or other underlying structure finder according to aspects of the invention can include components for performing a traditional method of stud detection (e.g., electromagnetic, magnetic, capacitive, acoustic, and radar systems) and an IR imaging device. The IR imaging device can include any appropriate detectors for detecting IR radiation from a target scene, for example, arranged in an array of detectors. The stud finder can include any combination of features typically found on a traditional stud finder, including but not limited to, an actuation mechanism for activating the stud finding components, a sensitivity adjustment for adjusting the sensitivity of the stud finding components, one or more lights to indicate the presence or absence of a stud to a user, and a speaker for producing a tone for alerting the user of the presence or absence of a stud. The stud finder can include a display configured to display IR image data generated by the IR imaging device for allowing a user to visualize the detected IR radiation. The display can be configured to display the IR image data in any appropriate IR visualization technique, such as grayscale or a false color pallet. In some embodiments, the user can select the IR visualization scheme via a user interface on the stud finder. In some embodiments, the stud finder can include any combination of a visible light (VL) imaging device for generating VL image data, one or more laser pointers or other visual indicators, and a non-contact voltage detector.

During use, a user can select a mode of stud-finding operation, such as an electromagnetic or other traditional stud finder mode, IR image mode, or a combination mode in which both features are used. The stud finder can communicate detection of underlying wall structures to a user in any number of a variety of ways. For example, as mentioned previously, the stud finder can act as a typical traditional stud finder with the ability to for a user to toggle between traditional operation and IR imaging. Utilizing IR imaging techniques can include viewing IR image data of the area under analysis to view thermal gradients (e.g., viewing a false color IR image). IR image information can be combined with VL image information, as described, for example, in U.S. Pat. No. 7,535,002, entitled "CAMERA WITH VISIBLE LIGHT AND INFRARED BLENDING," which is assigned to the assignee of the instant application, and which is hereby incorporated by reference in its entirety. In such a combination, the stud finder can present a VL image of the scene with an IR color alarm configured to represent areas of temperature above or below a certain threshold, or thermal gradients above or below a certain magnitude. In some embodiments, IR image data can be presented in areas of the image with detected temperatures within our outside of a selected or predetermined temperature range.

The stud finder can combine traditional stud finding data along with IR image data to present a combined detection to a user. For example, the stud finder can be configured to present an IR image having graphical markers indicating the traditional stud finder reading across a scene. In some embodiments, the stud finder can include a processor to analyze data acquired from one or both of the traditional stud finder sensor and the IR imaging device to generate a display. For instance, in some examples, the processor can generate and display a probability map or display designating areas in which underlying studs or other structure may be present.

In some embodiments, the stud finder can utilize the laser pointer to indicate to a user where a stud or other underlying structure is likely present beneath a wall surface, allowing the user to visualize the location of the underlying object on the wall directly. In some such embodiments, the laser pointer is fixed to the stud finder so that the user can aim the laser pointer by repositioning the stud finder. In some examples, the laser pointer is configured so that it is directed near the center of the target scene viewed by one or more imaging devices. Accordingly, if a user visually detects the presence of a stud or other underlying structure beneath the surface of a wall, the user can reposition the stud finder so that the laser substantially points to the center or edge of the underlying structure. In some embodiments, the stud finder can include a plurality of lasers for visually indicating a plurality of locations to a user on a surface.

FIG. 1 is an exemplary view of a stud finder according to some embodiments of the invention. As shown, the stud finder 100 includes a display 102 for displaying image data received by one or both IR and VL imaging devices. As shown, the display shows a stud 150 located in the center of the analysis region. In the illustrated embodiment, the stud 150 appears gray, indicating a different thermal signature from the white background (representing areas in which no stud is present). Accordingly, a user can easily see the presence of the stud 150 on the display 102.

The stud finder 100 further includes an indicator 104 for indicating to the user the presence or absence of a stud. Indicator 104 can include a light, a speaker, or any other appropriate signaling device. The stud finder 100 can include any number of various indicators to indicate varying likelihood of a stud being detected. One or more indicators 104 can be used to signal the presence or absence of a stud to a user based on the IR image data, received traditional stud finder data (e.g., electromagnetic, magnetic, capacitive, acoustic, or radar data), or a combination thereof. In some examples, the indicator 104 can be included on the display 102. The stud finder 100 includes user interface buttons 110 for a user to interface with the stud finder 100. For example, the user can use buttons 110 to select the mode of operation (e.g., IR imaging, electromagnetic or other traditional stud finder operation, etc.) or other configurable parameters regarding stud finder 100 operation, such as display type, sensitivity, or activation of components such as one or more laser pointers or non-contact voltage detectors. In the illustrated embodiment, the stud finder 100 includes a handle 112 for the user to grip while operating the stud finder 100. Handle 112 can be positioned proximate user interface buttons 110 for convenient access.

FIGS. 2-11 provide various examples of display modes and features that can be presented or observed using embodiments of a stud finder. Such display modes can make use of any combination of an IR imaging device, a VL imaging device, and one or more laser pointers. In addition, some such displays can prompt a user to perform one or more follow-up measurements, which in some embodiments can be performed using additional components of a stud finder.

Figure 2:
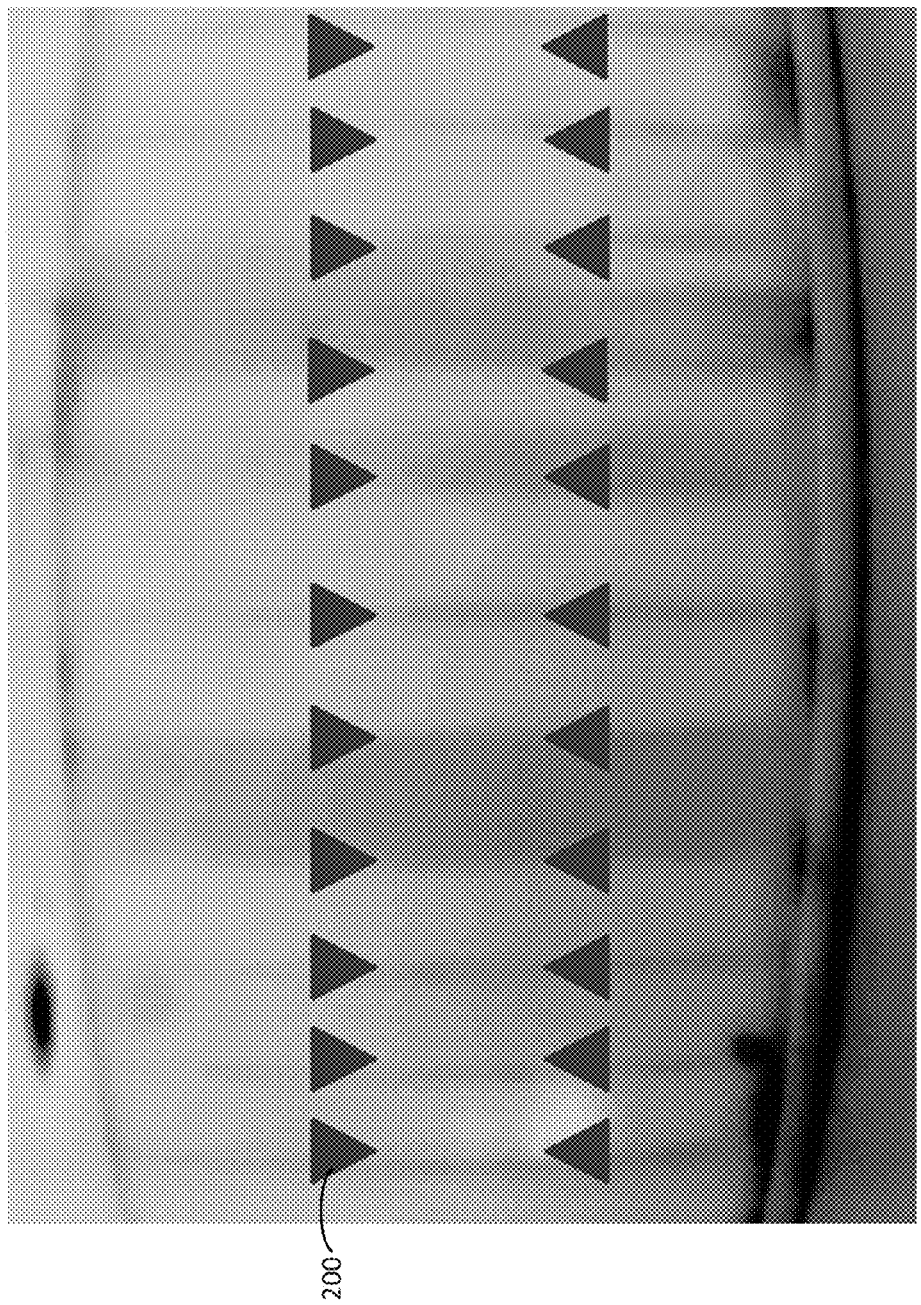
FIG. 2 is a representation of a scene including a wall having an underlying structure.

FIG. 2 is a representation of a scene including a wall having an underlying structure. As shown, the underlying structure of the wall is presented in a darker color gray than the spaces between the parts of the structure. The stud finder is capable of generating on the display a plurality of indication markers 200 which indicate likely locations of studs. In some examples, indication markers 200 can be placed at the edge or center of detected studs. Indication marks can customizable by a user, with customizations including size, shape, orientation, stud detection sensitivity, and the like. In some instances, one or more studs can include a plurality of indication markers.

Figure 3:
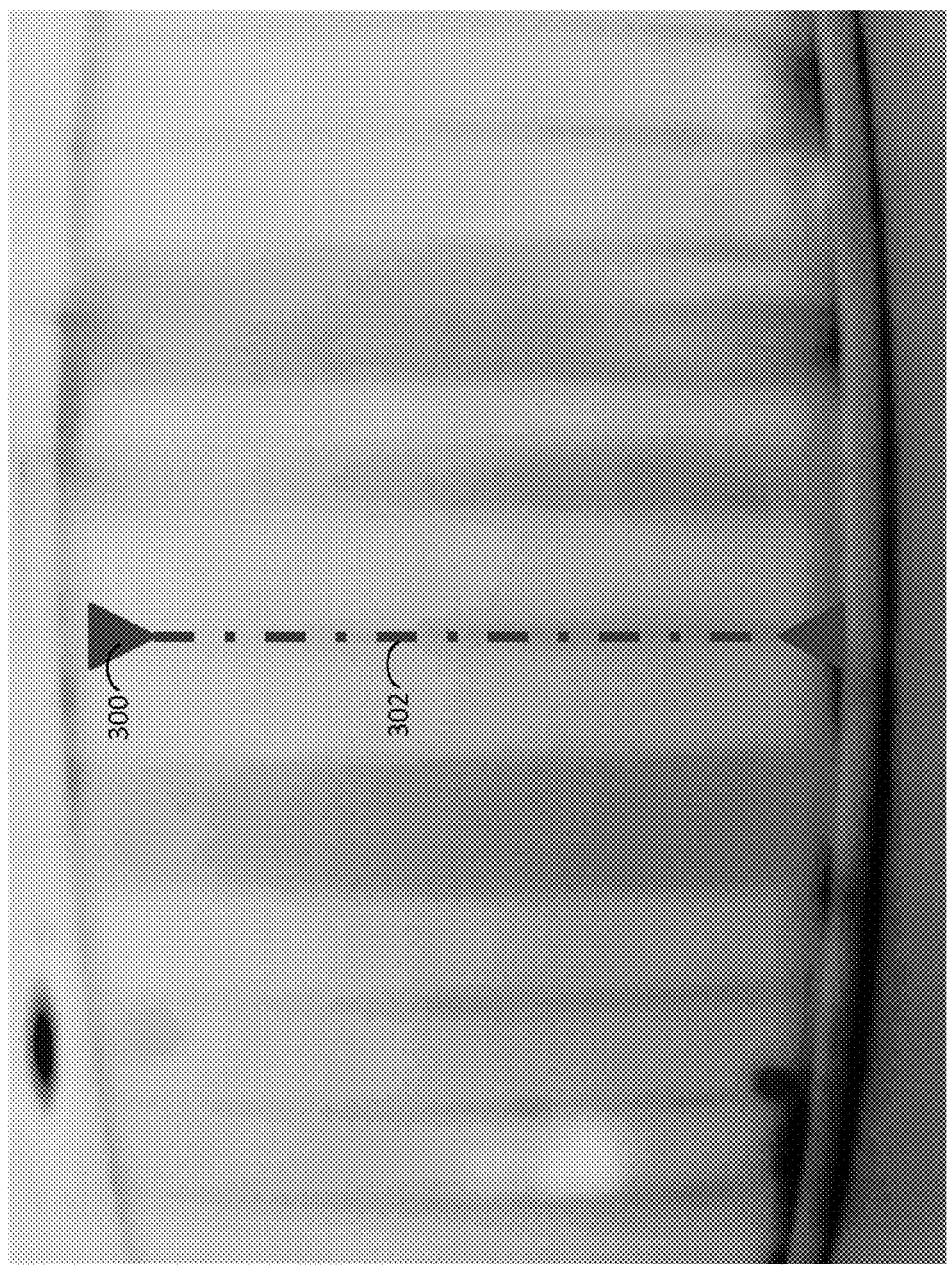
FIG. 3 is an alternative representation of a scene including a wall having an underlying structure.

FIG. 3 is an alternative representation of a scene including a wall having an underlying structure. In the example of FIG. 3, indication markers 300 are disposed on a single stud, with a line 302 connecting the indication markers 300 and substantially overlaying the stud location. In some examples, the stud finder is configured to identify and mark a single stud near the center of the display. Additionally or alternatively, in some embodiments, a user may select an area on the screen corresponding to a possible stud. In some such embodiments, the stud finder may identify (e.g., using indication markers and/or a line similar to 300, 302) a stud or other underlying wall structure nearest to the portion of the scene identified by the user.

Figure 4:
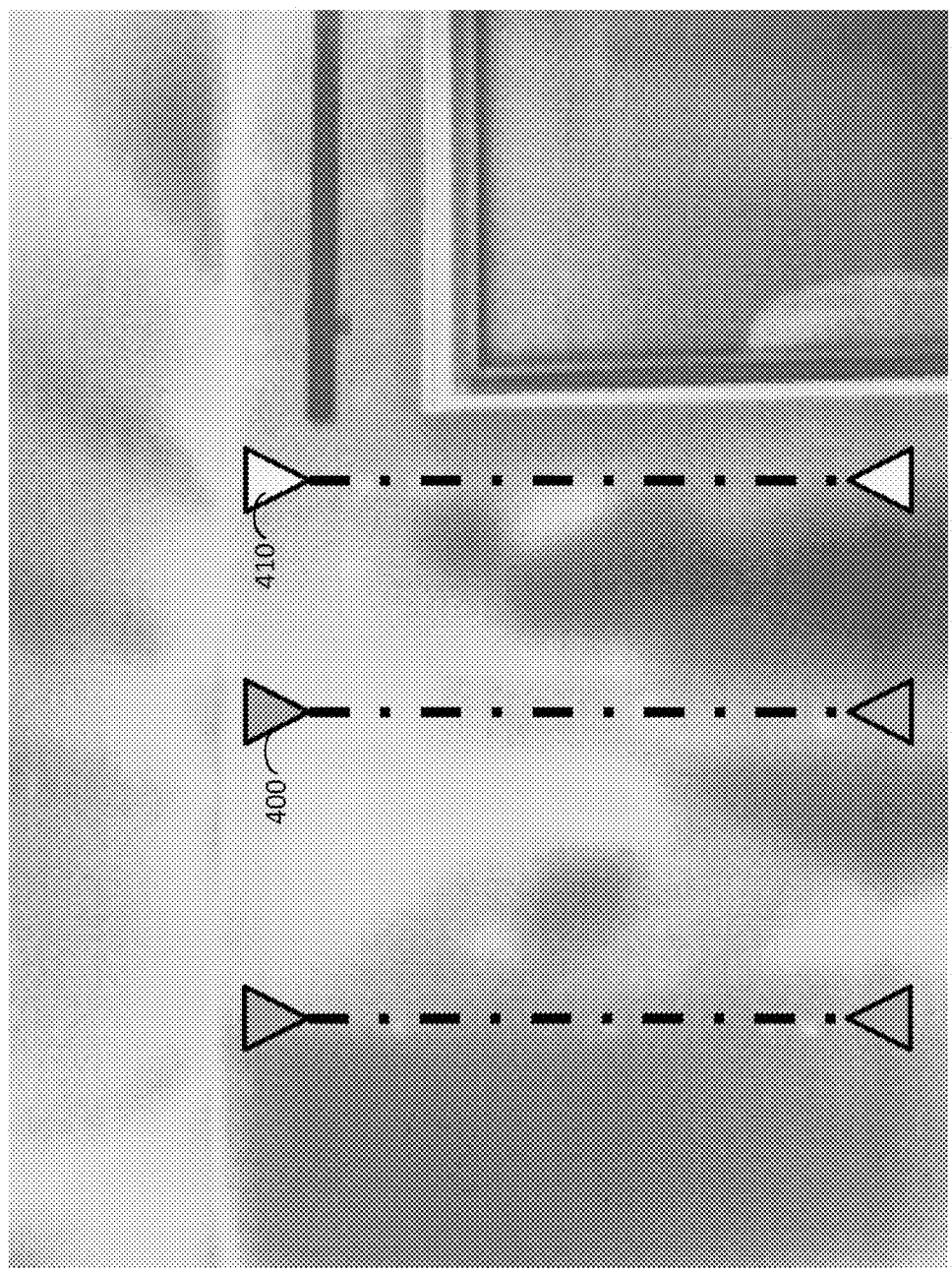
FIG. 4 is an alternative representation of a scene including a wall having an underlying structure.

In some examples, indication markers can indicate a level of certainty of the presence of a stud. FIG. 4 is an alternative representation of a scene including a wall having an underlying structure. In the example of FIG. 4, indication markers 400 are shown as being a first color to represent a first likelihood of a stud or other underlying structure at the indicated location in the represented image. Indication markers 410 are shown as being a second color different from the first, to represent a second likelihood of a stud or other underlying structure at the indicated location in the represented image. In general, the likelihood of studs can be illustrated to a user by the color, size, shape, or any other distinguishable feature of the indication marks. In some embodiments, the user can select the stud likelihood representation scheme.

In some embodiments, the stud finder determines portions of the scene that meet at least a certain likelihood threshold for comprising underlying wall structure, and automatically includes indication markers (e.g., 400, 410) representing the locations of possible structures. The automatically detected structure can be represented to the user by using indication markers indicative of the likelihood of underlying structure being present. In some examples, the user can select a likelihood threshold below which potential underlying structure is not identified or indicated (e.g., using indication markers). Additionally or alternatively, a user may select a portion of a scene (e.g., a point, area, etc.) via an interface, for example, using a cursor controlled by buttons, mouse, joystick, and the like, and/or a touchscreen interface. The stud finder may subsequently display indication markers (e.g., 400, 410) proximate the portions selected by the user and indicative of the likelihood of underlying structure in that portion of the image.

Figure 5:
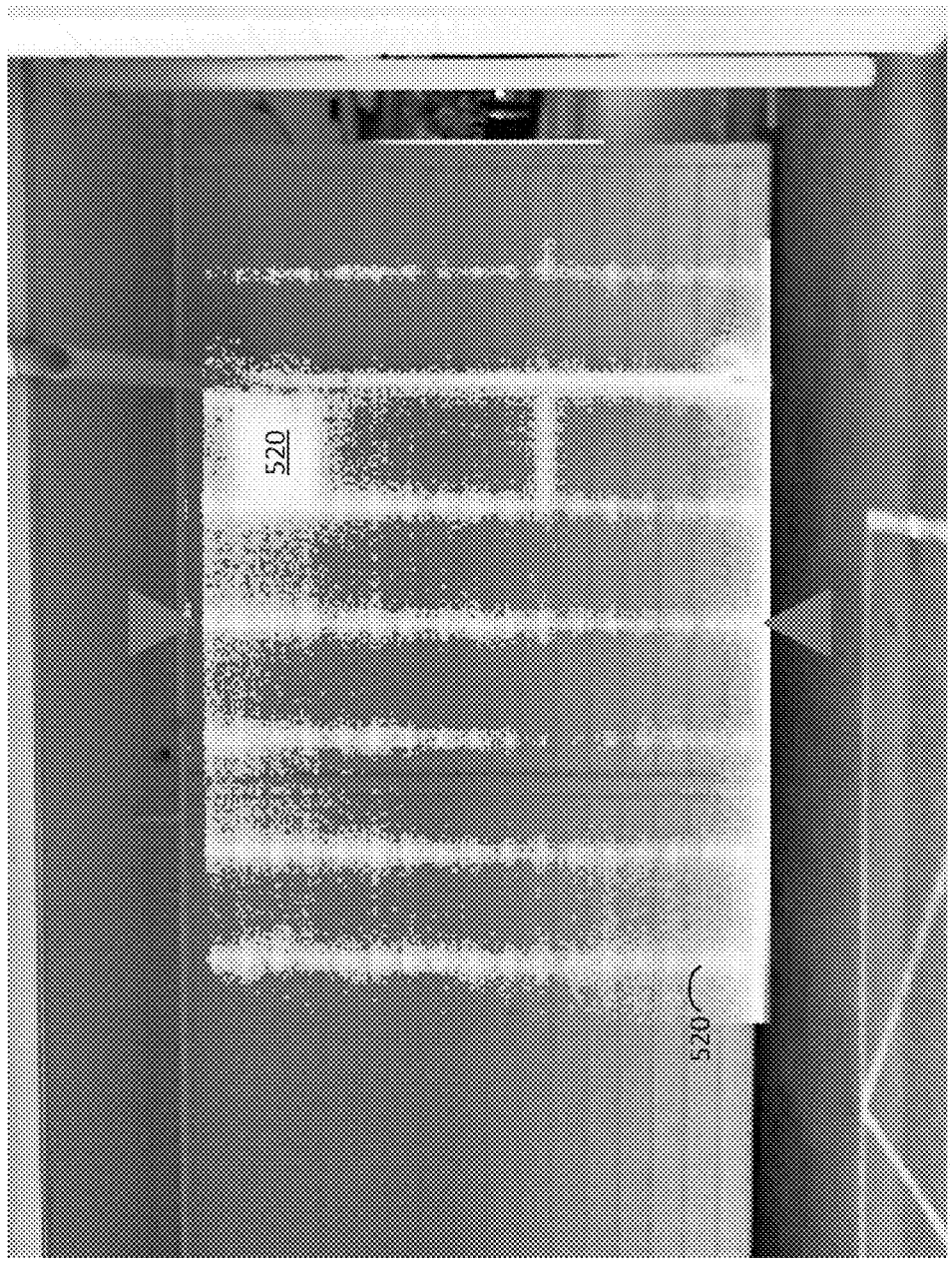
FIG. 5 is an exemplary display including both infrared and visible light image data.

As described, the stud finder can include both IR and VL imaging devices for detecting IR and VL image data. Such data can be combined to present the user. FIG. 5 is an exemplary display including both infrared and visible light image data. In the example of FIG. 5, a VL scene includes IR image data 520 in only a portion of the scene. In some examples, portions of the scene including IR image data can be determined in any number of ways. For example, in some embodiments, any portion of the target scene including a temperature above (or, in alternative embodiments, below) a predetermined threshold are presented including IR image data. For instance, in some examples, IR image data representative of temperatures above a predetermine threshold may indicate heat conducted through underlying wall structure(s) from a source behind a wall. Accordingly, portions of a scene satisfying a thermal condition and therefore including IR image data, such as IR image data 520 in FIG. 5, for example, may be indicative of underlying wall structure. Similarly, in some examples, IR image data may be presented in portions of the target scene in which the representative temperature is within a temperature range. In general, in various embodiments, any range or threshold based on IR image data can be employed for distinguishing parts of the image in which to include IR image data. Such an image can include indication markers representative of possible locations of underlying structure. In some examples, determination of portions of the scene in which to include IR image data can be made according to thermal information, such as temperature thresholds, alarms, and the like. Some such methods are described in U.S. Pat. No. 7,994,480, filed Jul. 19, 2006, and entitled "VISIBLE LIGHT AND IR COMBINED IMAGE CAMERA," which is assigned to the assignee of the instant application and which is herein incorporated by reference in its entirety.

Figure 6:
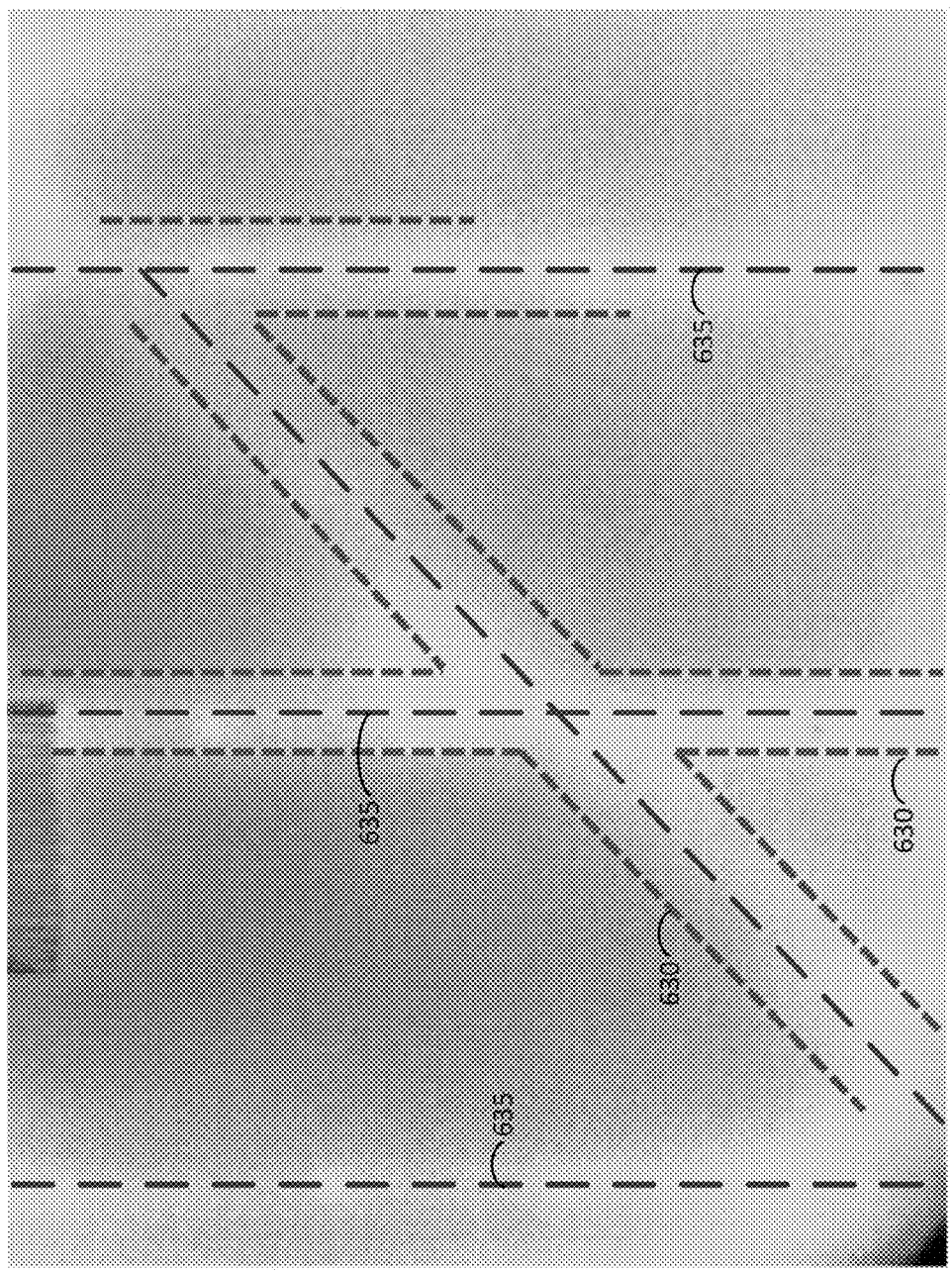
FIG. 6 is a representation of a target scene showing underlying structure in an infrared image.

In some examples, IR and/or VL image data can be analyzed to identify details of underlying wall structures. For example, FIG. 6 is a representation of a target scene showing underlying structure in an IR image. In some embodiments, the stud finder can provide outlines 630 indicating the possible perimeter edges of one or more studs or other underlying features. Outlines 630 can be include as an alternative to, or in addition to, indication markers as shown in other figures. In some embodiments, a user may visually inspect the image and manually add outlines 630 to areas considered to represent the outlines of underlying wall structure(s). Additionally or alternatively, the stud finder can perform image analysis (e.g., edge detection or other processing techniques) to determine sections likely to correspond to the outlines of underlying wall structures, and add outlines 630 to the image. Various aspects of outlines 630 can be determined by a user, such as color, weight, line style, detection sensitivity, and the like. Edge detection and processing can be performed, for example, as described in U.S. patent application Ser. No. 14/222,153, filed Mar. 21, 2014, and entitled "VISIBL LIGHT IMAGE WITH EDGE MARKING FOR ENHANCING IR IMAGERY," and U.S. patent application Ser. No. 14/837,757, filed Aug. 27, 2015, and entitled "EDGE ENHANCEMENT FOR THERMAL-VISIBLE COMBINED IMAGES AND CAMERAS," each of which is assigned to the assignee of the instant application and is hereby incorporated by reference in its entirety.

Additionally or alternatively, in some embodiments, the stud finder can display centerlines 635 indicative of the location of the center of the stud locations. Similar to outlines 630, in various embodiments, centerlines 635 may be added manually by a user and/or automatically by the stud finder. In some examples, centerlines 635 can be added or removed from an image by the user independently of outlines 630. Accordingly, various displays can include any combination of outlines 630 and centerlines 635 for indicating possible stud locations.

Figure 7:
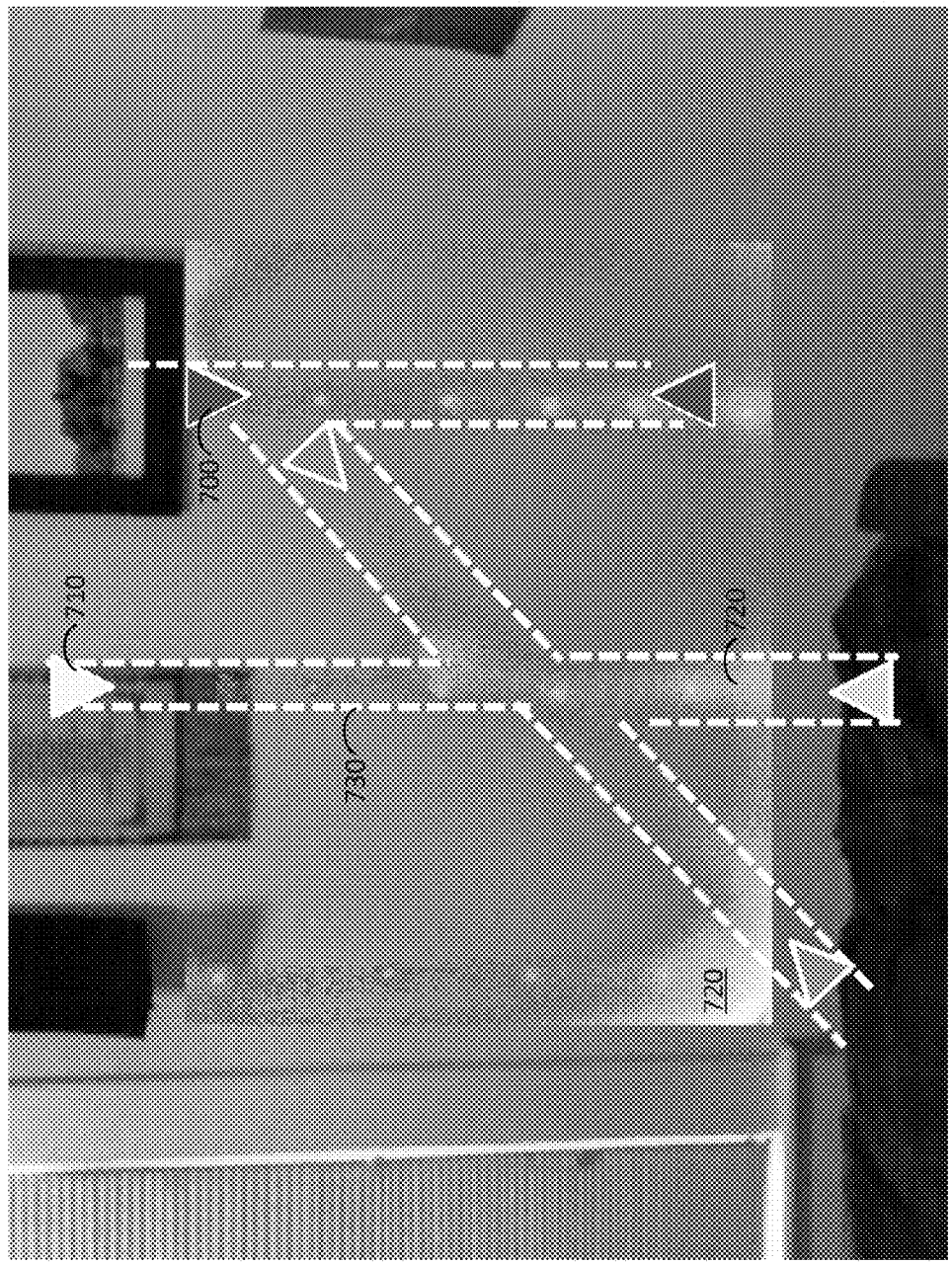
FIG. 7 illustrates an exemplary display including a variety of features.

In general, any combination of display modes can be combined. For example, FIG. 7 illustrates an exemplary display including a variety of features. The display illustrated in FIG. 7 includes IR image 720 data presented in a subset of portions of the display. As discussed, such portions can include portions meeting one or more predetermined temperature criteria such as being above a threshold, below a threshold, within a range, etc. In addition, the image can include outlines 730 and indication markers 700, 710 representing portions of the image likely including studs or other underlying structures. Such features can be added manually by a user or can be detected and added by the stud finder. In some examples, the stud finder identifies and/or includes such features in the display based on a prompt from the user.

As discussed with relation to FIG. 4, indication markers 700, 710 can be presented as different colors (or any other distinguishable feature) to indicate to a user the probability of each indication marker representing the location of a stud. The image of FIG. 7 can be presented within a VL image of the target scene to provide context to the user regarding the location of the studs or underlying structure beneath the visible wall surface. In some examples, IR image data can be removed from the display by the user, leaving only the VL image along with at least one of indication markers 700, 710 and outline 730. A user may then use the indication markers 700, 710 and/or outline 730 included in the VL image for identifying portions of the wall likely to include studs or other underlying structure.

Figure 8:
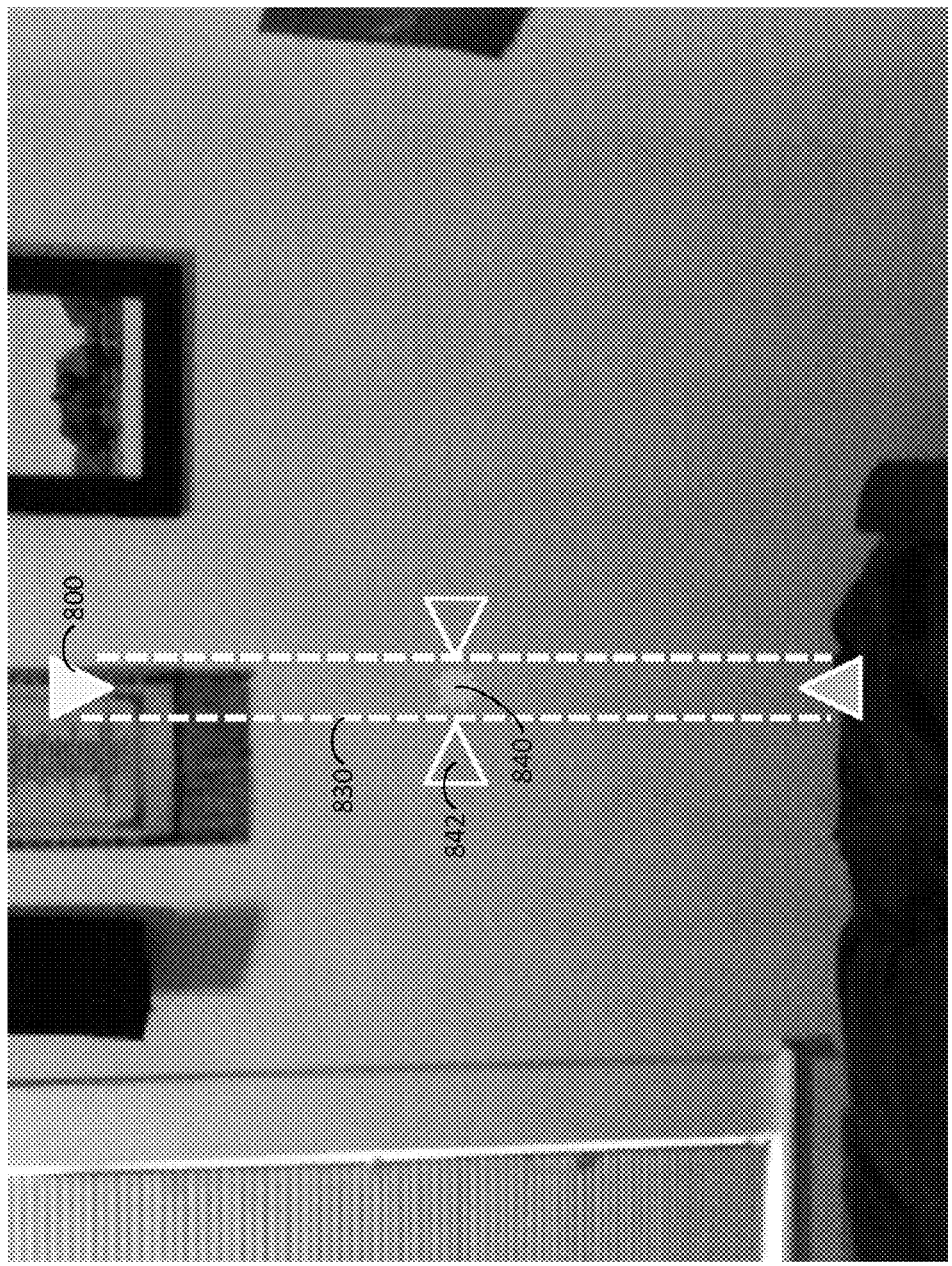
FIG. 8 is a view of an exemplary scene including a laser.

As previously described, various embodiments can include one or more laser pointers or other visible light source indicators for visually indicating features in an image, such as the location of a stud or other underlying object. FIG. 8 is a view of an exemplary scene including a laser. In the display of FIG. 8, a laser pointer is visible in a VL image representation of the target scene. The display includes indication markers 800 and outline 830 indicating the possible presence of a stud. While the indication markers 800 and outline 830 can be generated from the IR image data, IR image data is not displayed in the display of FIG. 8. FIG. 8 includes a laser spot 840, which can be representative of a laser from the laser pointer incident on a particular portion of the target scene. In some embodiments, the user can manipulate the stud finder, or in some examples, the laser pointer on the stud finder, in order to position the laser spot 840 within the outline 830. Accordingly, the laser pointer can direct a laser to a spot on the wall surface to indicate the possible location of a stud such that the indication is visible without viewing the scene through the stud finder. In some examples, the laser spot 840 can include laser spot indicator markers 842.

Figure 9:
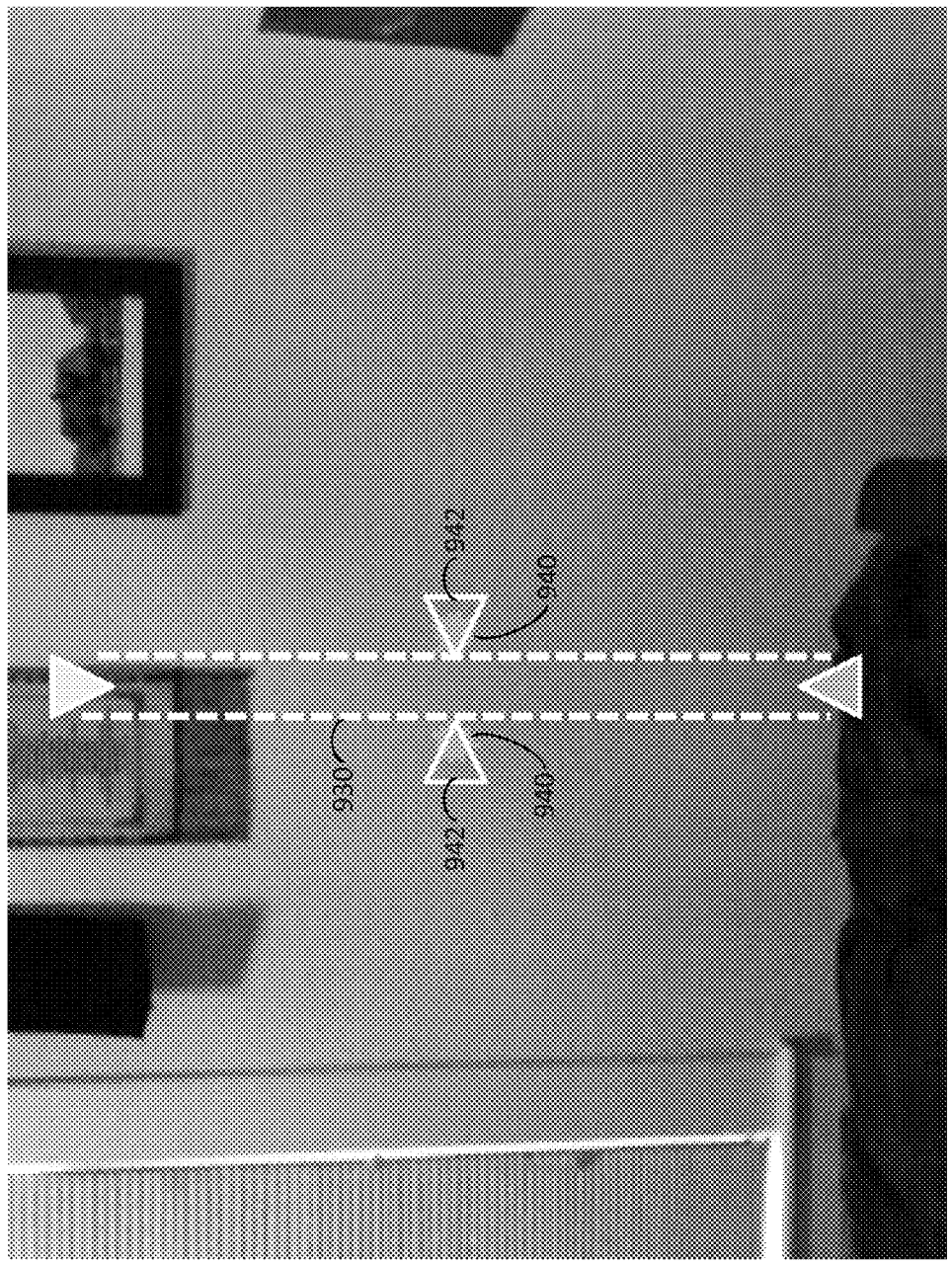
FIG. 9 is an alternative view of an exemplary scene including a laser.

In some embodiments, the stud finder can include a plurality of laser pointers. Such laser pointers can be used to indicate locations of a plurality of studs, a plurality of features of a single stud, or a combination thereof. FIG. 9 is an alternative view of an exemplary scene including a laser. In the example of FIG. 9, laser spots 940 are positioned at opposing edges of outline 930, which represents the detected location of a stud or other underlying structure. In such an example, the user can reposition the stud finder (or the laser pointers on the stud finder) so that the lasers are incident on either side of a detected stud. Accordingly, the user can determine a possible stud location based on an area between the laser spots on the wall surface without viewing the scene through the stud finder. As with the embodiment illustrated in FIG. 8, the laser spots 940 can include laser spot indicators 942.

Figure 10:
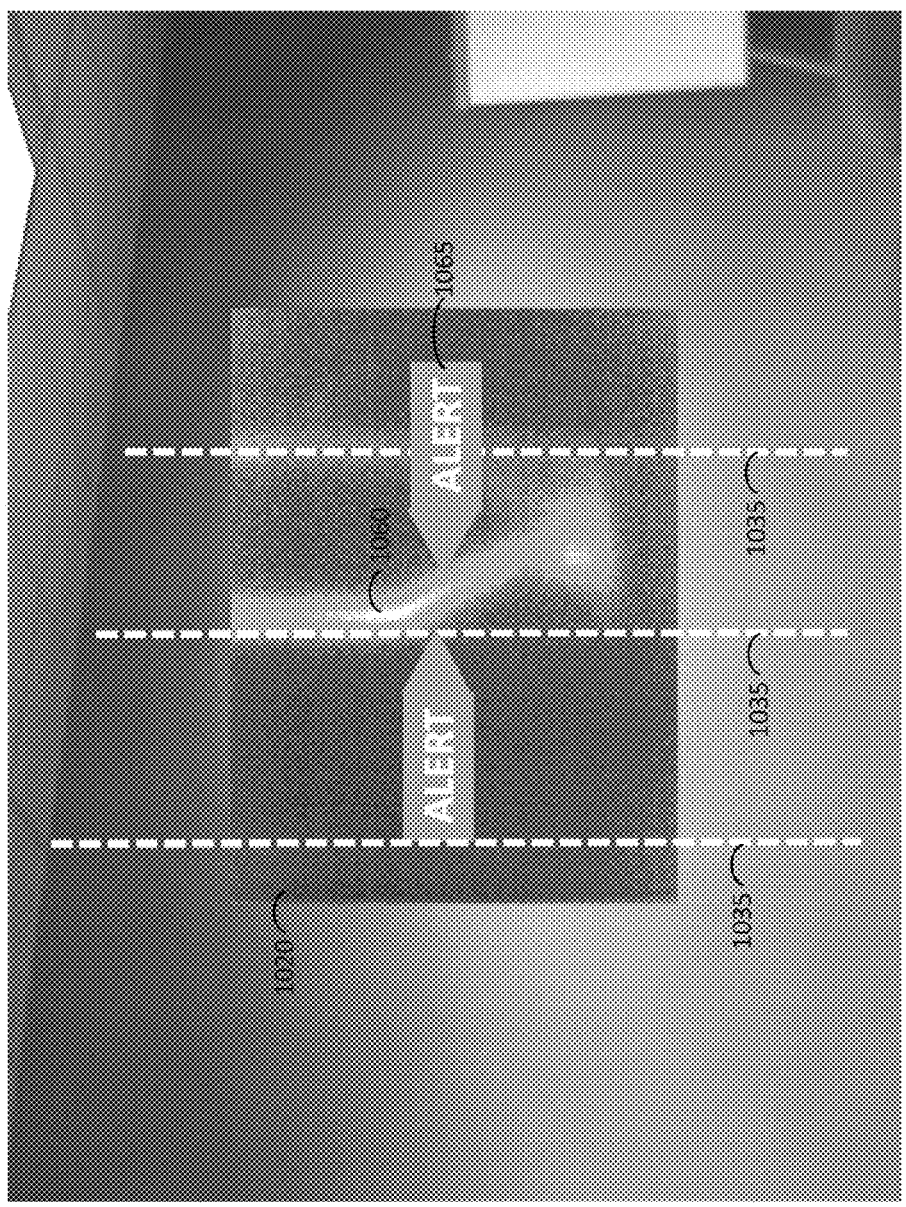
FIG. 10 is an exemplary image having infrared image data presented within visible light image data.

In some embodiments, the stud finder can detect other features of a target scene having a detectable heat pattern. For example, electrical wires under excess load and located behind a wall surface can become hot, locally heating the wall surface and becoming visible via the IR imaging device of the stud finder. FIG. 10 is an exemplary image having IR image data 1020 presented within VL image data. The stud finder detects possible locations of studs indicated by centerlines 1035. However, a noticeably hot portion 1060 of the scene does not match any location of the detected studs. Additionally, the detected hot portion 1060 can include a thermal signature much different than that of detected studs (e.g., hotter). Thus, in some embodiments, a threshold for presenting IR image data within VL image data may be set so that studs are not necessarily included in the IR image data, but hotter components, such as a hot electrical wire, may be displayed. Accordingly, the stud finder can display alerts 1065 to alert the user to a potential hazard located behind the wall surface. In the event of a hot wire, the user can use the non-contact voltage detector to confirm the location of an electrical hazard behind the wall surface.

Figure 11:
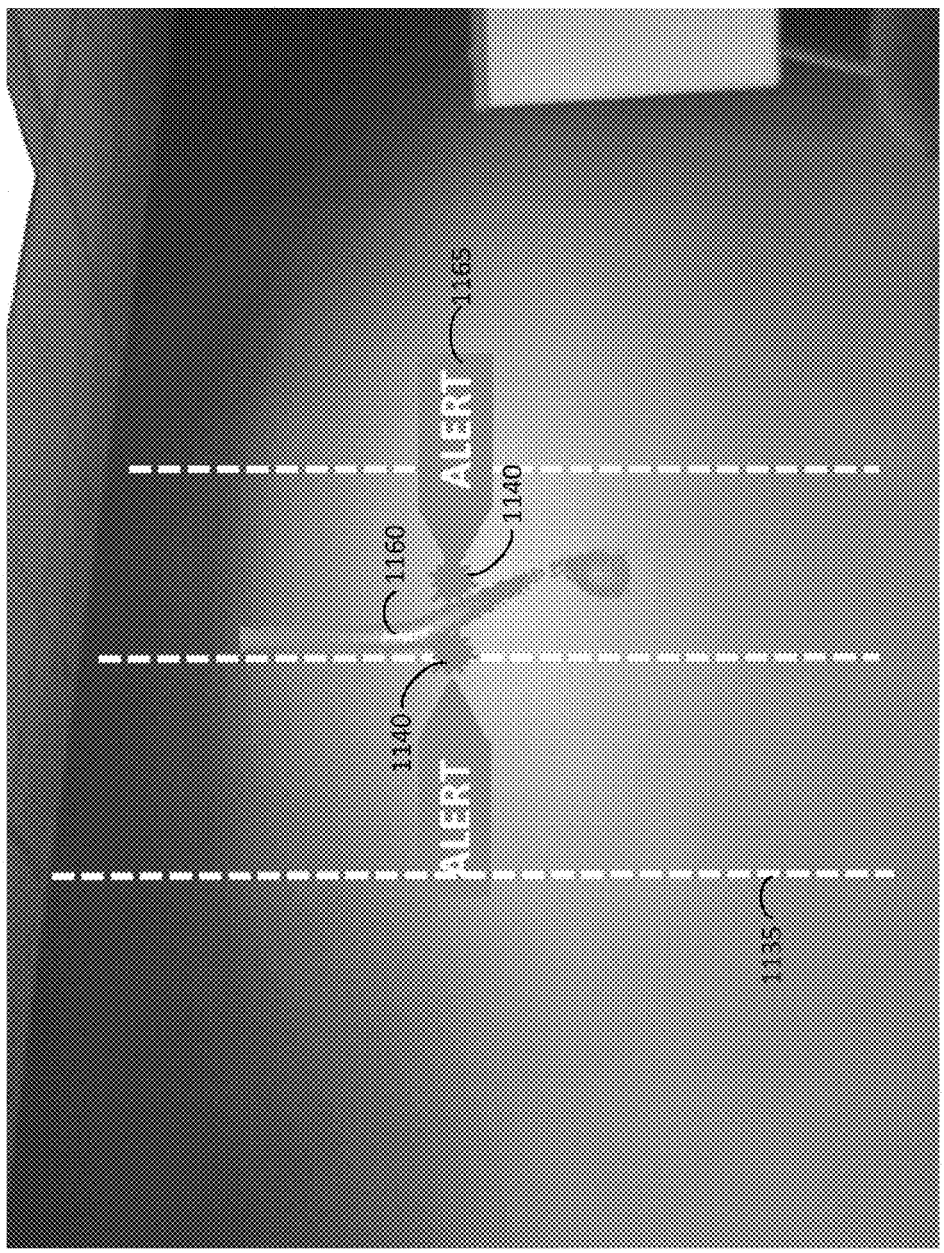
FIG. 11 is an exemplary view of a scene including locations of possible underlying structure and hazards.

In some embodiments, a user can utilize the one or more laser pointers of the stud finder to locate the location of a possible hazard. FIG. 11 is an exemplary view of a scene including locations of possible underlying structure and hazards. FIG. 11 includes a VL scene, including centerlines 1135 indicating possible stud locations. An alarm or other temperature-dependent display of IR image data shows the presence of a hot portion 1160 in the scene. The stud finder can provide alerts 1165 to the user to indicate the presence of a potential hazard. In response, the user can position the stud finder (or laser pointers of the stud finder) so that the laser pointers produce laser spots 1140 on either side of the hot portion 1160. Laser spots 1140 can be visible on the VL image representation shown in the stud finder and also visible by the user on the wall surface. Accordingly, the user can locate the potential hazard indicated by the hot portion 1160 and perform further analysis, for example with the non-contact voltage detector in the stud finder. Additionally, the visual indication of the potential hazard (e.g., via laser spots 3340) may alert a user to not cut or drill into the wall proximate the possible hazard.

It will be appreciated that among the various display configurations of FIGS. 2-11, such displays are exemplary and do not limit the display possibilities. Any combinations of such features are possible. In some embodiments, a user can individually toggle the display of various features, such as outlines, centerlines and indication markers representative of detected studs. In some embodiments, the user can designate various colors, shapes, and sizes of indicators for display, and further how such indicators can represent the likelihood of the presence of studs in a given area. Further, the user can set temperature alarms or conditions to designate areas in which to present IR image data, can present the image entirely in IR image data, VL image data, or a combination thereof. As shown in the illustrated embodiments, exemplary operation can be performed in any number of environments, including indoors or outdoors, and can be applied to internal or external walls having underlying structure.

It will be appreciated that, while generally referred to as a stud finder, the device can be used to detect other underlying structures or for other purposes and is not limited to use as detecting the presence of studs. Various embodiments have been described. Such examples are non-limiting, and do not define or limit the scope of the invention in any way. Rather, these and other examples are within the scope of the following claims.

The invention claimed is:

1. An underlying wall structure finder comprising:
an first sensor configured to generate a first set of data indicative of the location of a stud or other underlying structure beneath the surface of a wall;
at least one indicator configured to provide an indication to a user based on the first set of data;
an infrared (IR) imaging device configured to generate IR image data indicative of the heat pattern of a target scene; and
a display configured to display IR image data generated from the IR imaging device; wherein
at least one of the at least one indicator and the display provides an indication to the user regarding the presence of an underlying wall structure at a location beneath the surface of a wall; and wherein
the indication regarding the presence of an underlying wall structure includes information regarding the likelihood that an underlying wall structure is present at the location.

2. The underlying wall structure finder of claim 1, further comprising a user interface, and wherein a user can toggle between options of receiving an indication based on data received from the first sensor, IR image data from the IR imaging device, or a combination thereof.

3. The underlying wall structure finder of claim 1, wherein the at least one indicator is presented on the display.

4. The underlying wall structure finder of claim 1, further comprising a processor, wherein the processor is configured to:
receive the IR image data and first set of data; and
generate a probability map designating areas in which underlying studs or other structure may be present on the display.

5. The underlying wall structure finder of claim 1, further comprising a visible light (VL) imaging device, and wherein the display is configured to present VL image data generated from the VL imaging device.

6. The underlying wall structure finder of claim 5, configured to present VL image data and IR image data simultaneously.

7. The underlying wall structure finder of claim 6, wherein the IR image data is presented selectively on the display according to whether or not the IR image data satisfies a predetermined condition.

8. The underlying wall structure finder of claim 1, further configured to present one or more visual representations on the display indicative of the location of a stud behind a wall surface.

9. The underlying wall structure finder of claim 8, wherein the one or more visual representations includes at least an indicator element, an outline, or a centerline.

10. The underlying wall structure finder of claim 1, further comprising a non-contact voltage detector.

11. The underlying wall structure finder of claim 1, wherein the first sensor comprises at least an electromagnetic sensor, a magnetic sensor, a capacitive sensor, an acoustic sensor, or a radar sensor.

12. The underlying wall structure finder of claim 1, further comprising a laser configured to emit a laser beam toward the surface of the wall in the location of a detected underlying structure behind the wall.

13. A handheld infrared imaging device comprising:
an IR imaging sensor configured to generate IR image data representative of a target scene;
a display configured to present a representation of the generated IR image data; and
a processor configured to:
receive the generated IR image data;
process the received IR image data to determine the location of one or more underlying structures behind a surface in the IR image data; and
generate the representation of the IR image data for display, wherein:
the representation of the IR image data comprises one or more visual indicators representative of the location of an underlying structure behind the surface determined from the received IR image data.

14. The handheld infrared imaging device of claim 13, further comprising a user interface, and wherein including, on the display, one or more visual indicators representative of the location of an underlying structure behind as surface comprises receiving, via the user interface, an indication of the location of one or more underlying structures and displaying a visual indicator at the indicated location.

15. The handheld infrared imaging device of claim 14, wherein the interface comprises a touchscreen.

16. The handheld infrared imaging device of claim 13, wherein the determining the location of one or more underlying structures comprises determining the likelihood that an underlying structure is located at the location and wherein the one or more visual indicators includes information related to the likelihood of underlying structure at the indicated location.

17. The handheld infrared imaging device of claim 16, wherein the information related to the likelihood of underlying structure at the indicated location comprises the color of the one or more visual indicators.

18. The handheld infrared imaging device of claim 13, further comprising a visible light (VL) imaging configured to generate VL image data representative of a target scene, and wherein the processor is configured to process IR image data and VL image data to generate a display including both IR image data and VL image data.

19. The handheld infrared imaging device of claim 18, wherein the display including both IR image data and VL image data selectively includes IR image data in locations in which the IR image data satisfies a predetermined condition.

20. The handheld infrared imaging device of claim 19, wherein the predetermined condition comprises a likelihood of the presence of underlying structure behind a surface.

21. A method for detecting underlying structure behind the surface of a wall comprising:
receiving infrared radiation from a target scene including the wall;
analyzing the heat pattern of the target scene based on the received infrared radiation;
determining the location of one or more underlying structures behind the wall surface and the likelihood of the presence of the one or more underlying structures based on the analysis of the heat pattern; and
indicating the likelihood of the presence of the one or more underlying structures behind the wall surface.

22. The method of claim 21, wherein indicating the likelihood of the presence of the one or more underlying structures behind the wall surface comprises indicating, on a display, the likelihood of the one or more underlying structures being present at one or more corresponding locations.

23. The method of claim 22, wherein indicating, on the display, the likelihood of the one or more underlying structures being present at one or more corresponding locations comprises determining whether a location in the target scene meets a likelihood threshold for including underlying wall structure, and, if the location meets the likelihood threshold, including one or more indication markers representing the location in the scene that satisfies the likelihood threshold.

24. The method of claim 23, wherein the one or more indication markers include information regarding the likelihood of underlying structure being present at the corresponding location.

25. The method of claim 22, further comprising the step of receiving visible light radiation from the target scene including the wall, and wherein the display includes visible light image data representative of the scene.

* * * * *